(12) United States Patent
Brunswig et al.

(10) Patent No.: US 8,949,678 B2
(45) Date of Patent: Feb. 3, 2015

(54) GENERATION OF ERROR MESSAGES AND PROGRESS INFORMATION MESSAGES VIA A COMMON INTERFACE

(75) Inventors: Frank Brunswig, Heidelberg (DE); Frank Jentsch, Muehlhausen (DE); Holger Rose, Bad Schoenborn (DE)

(73) Assignee: SAP SE, Walldorf (DE)

( * ) Notice: Subject to any disclaimer, the term of this patent is extended or adjusted under 35 U.S.C. 154(b) by 310 days.

(21) Appl. No.: 13/471,963

(22) Filed: May 15, 2012

(65) Prior Publication Data

US 2013/0311839 A1 Nov. 21, 2013

(51) Int. Cl.
*G06F 11/00* (2006.01)

(52) U.S. Cl.
USPC .......................................................... 714/57

(58) Field of Classification Search
CPC ............ G06F 11/0766; G06F 11/0769; G06F 11/0784
USPC .......................................................... 714/57
See application file for complete search history.

(56) References Cited

U.S. PATENT DOCUMENTS

| | | | |
|---|---|---|---|
| 6,363,421 B2 * | 3/2002 | Barker et al. ................. | 709/223 |
| 2003/0084383 A1 * | 5/2003 | Yoshii et al. .................... | 714/57 |
| 2006/0143290 A1 * | 6/2006 | Dostert et al. ................ | 709/224 |
| 2007/0016639 A1 * | 1/2007 | Mukundan et al. ........... | 709/203 |
| 2009/0158099 A1 * | 6/2009 | Cui ................................. | 714/57 |
| 2010/0017252 A1 * | 1/2010 | Chaar et al. ........................ | 705/9 |
| 2010/0275054 A1 * | 10/2010 | Grace et al. ........................ | 714/2 |
| 2011/0161122 A1 | 6/2011 | Brunswig et al. | |
| 2011/0161960 A1 | 6/2011 | Nos et al. | |
| 2011/0264964 A1 * | 10/2011 | Murphy et al. ................. | 714/48 |
| 2012/0150935 A1 * | 6/2012 | Frick et al. ..................... | 709/201 |
| 2012/0230309 A1 * | 9/2012 | Junk ............................ | 370/338 |

\* cited by examiner

*Primary Examiner* — Joshua Lohn
(74) *Attorney, Agent, or Firm* — Brake Hughes Bellermann LLP

(57) ABSTRACT

The present description refers to a technique for receiving a client instruction, performing an action in response to the client instruction, generating an instance of a progress information message by the business object calling a first method of an API and identifying the progress information message to be generated, determining if an error condition occurs during the performing the action, generating an instance of an error message, if the error condition occurs, by calling the first method of the API, sending the progress information message instance from a second software work process to the client application in response to a request for progress information received by the second software work process from the client application, and sending the error message instance, if generated, from the first software work process to the client application.

20 Claims, 5 Drawing Sheets

MESSAGE DEFINITION EDITOR

1) System Message Group [▲]

- Error Message
    - Progress information Message

2) Message Type  `finalize-sales-order-msg`

3) Message Text  `Finalizing Sales Order – X% complete`

4) Parameters  `X`

5) Assign message (definition) to BO or Action  [▲]

- Sales Order BO
        - Action: Confirm items in stock
        - Action: Calculate taxes and apply discounts
        - Action: Calculate sales order total
    - Customer BO

[SAVE]

FIG. 2

GENERATION OF ERROR MESSAGES AND PROGRESS INFORMATION MESSAGES VIA A COMMON INTERFACE

TECHNICAL FIELD

This description is directed generally to business objects and message generation, and in particular, to a generation of error messages and progress information messages via a common interface.

BACKGROUND

Business object models may define structure and behavior of one or more corresponding data objects. For example, a model may define a specific structure (e.g., hierarchical nodes and associated fields or attributes) and behavior (e.g., one or more enabled services or actions performed) for a specific type of business object.

Business objects are real world entities modeled as objects in an information system. Business objects encapsulate both data structures and the functions or services applied to the data, while hiding their full complexity from other objects. This encapsulation of data and functions/services makes it easier to modify program components by allowing one to program with the relevant entities without having to know all the implementation details. Business objects also allow for the reuse of existing functions.

A service request may be received by a system from a client, which may cause the system to process and/or store information. This processing may result in a significant delay before a response is sent back to a requesting client. In some cases, progress information may be provided to the requesting client to provide information as to the progress of processing the request from the client.

SUMMARY

In one general aspect, a computer program product is provided. The computer program product is tangibly embodied on a computer-readable storage medium and includes executable code that, when executed, is configured to cause at least one data processing apparatus to receive a client instruction at a first software work process from a client application, perform, by a business object of the first software work process, an action in response to the client instruction, generate an instance of a progress information message by the business object calling a first method of an application programming interface (API) and identifying the progress information message to be generated, determine if an error condition occurs during the performing the action, generate an instance of an error message, if the error condition occurs, by calling the first method of the API and identifying the error message to be generated, send the progress information message instance from a second software work process to the client application in response to a request for progress information received by the second software work process from the client application, and send the error message instance, if generated, from the first software work process to the client application.

In another general aspect, a computer implemented method is provided that includes receiving a client instruction at a first software work process from a client application, forwarding the client instruction to a business object associated with the first software work process, performing, by the business object, an action in response to the client instruction, generating an instance of a progress information message by the business object calling a first method of an application programming interface (API) and identifying the progress information message to be generated, determining if an error condition occurs during the performing the action, generating an instance of an error message, if the error condition occurs, by calling the first method of the API and identifying the error message to be generated, sending the progress information message instance from a second software work process to the client application in response to a request for progress information received by the second software work process from the client application, and sending the error message instance, if generated, from the first software work process to the client application.

In another general aspect, an apparatus includes receiving logic configured to receive a client instruction at a first software work process from a client application, performing logic configured to perform an action in response to the client instruction, generating logic configured to generate an instance of a progress information message by calling a first method of an application programming interface (API) and identifying the progress information message to be generated, determining logic configure to determine if an error condition occurs during the performing the action, generating logic configured to generate an instance of an error message if the error condition occurs by calling the first method of the API and identifying the error message to be generated, progress information message sending logic configured to send the progress information message instance from a second software work process to the client application in response to a request for progress information received by the second software work process from the client application, and error message sending logic configured to send the error message instance, if generated, from the first software work process to the client application.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

BRIEF DESCRIPTION OF THE DRAWINGS

FIG. 2 is a diagram illustrating a message definition editor according to an example implementation.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
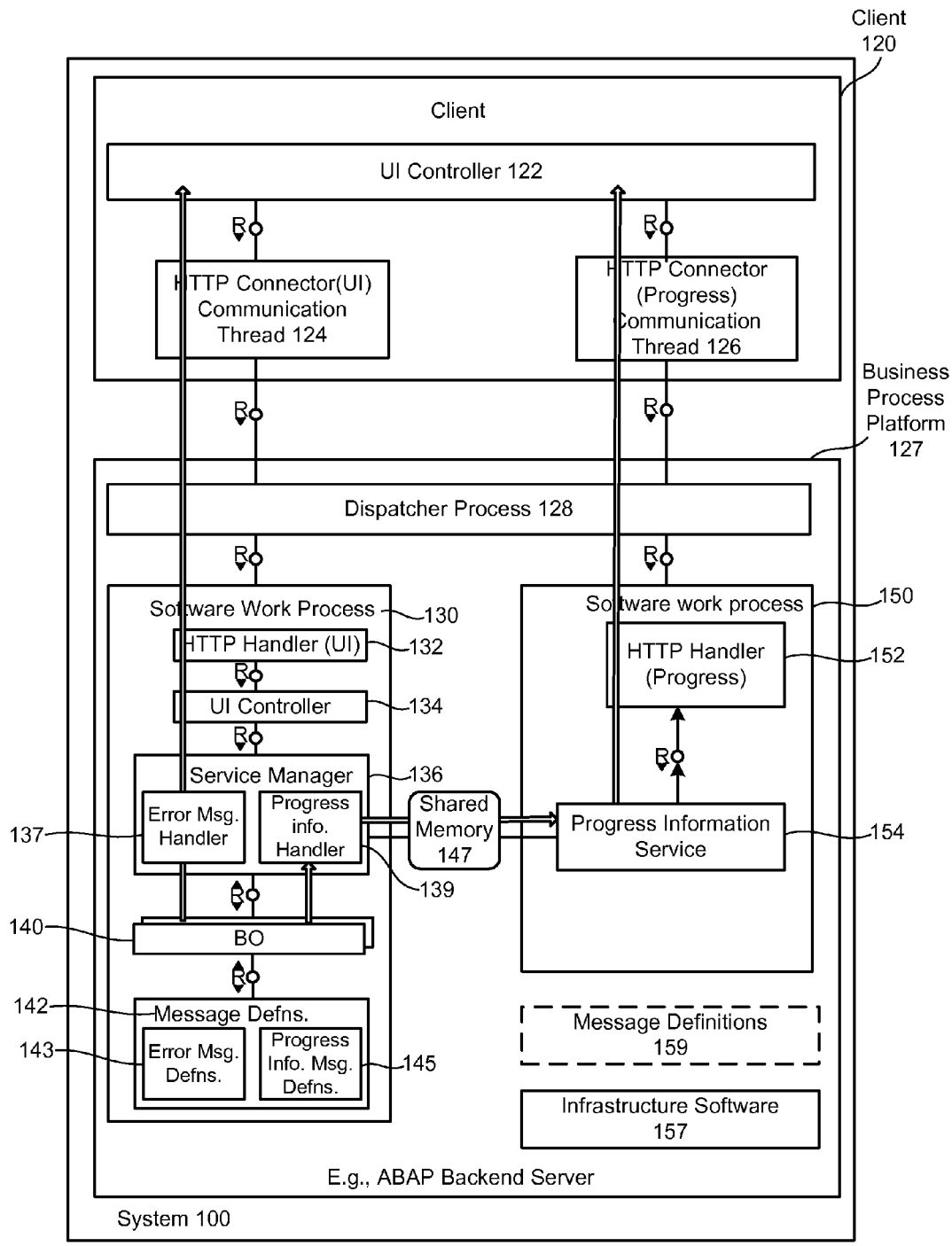
FIG. 1 is a block diagram of a system according to an example implementation.

FIG. 1 is a block diagram of a system according to an example implementation. System 100 includes a client 120 which may be running on a client computer and a business process platform 127. Client 120 may include a web browser or other client and may access services provided by business process platform 127. Client 120 may include a user interface (UI) controller 122 to control the user interface presented to or by client 122, e.g., based on information received from business process platform 127. Client 120*a* also include two connector communication threads to maintain communication with software work processes running on the business process platform 127, including: a HTTP (hyper-text transfer protocol) connector communication thread 124 for the user interface (UI) to send and receive UI information with a first work process of platform 127, and a HTTP connector communication thread 126 to request and receive progress information from a second work process of platform 127, for example.

Business process platform 127 may provide services to one or more clients. Business process platform 127 includes a dispatcher process 128 for receiving HTTP requests (or other requests) from clients (such as client 120) and forwarding or dispatching requests to one of multiple software work processes, for example. Business process platform 127 also includes multiple software work processes, such as software work process 130 and software work process 150. Each of software work processes 130 and 150 may independently execute tasks required of business process platform 127. For example, dispatcher process 128 may forward general HTTP requests to software work process 130, and may forward requests for progress information to software work process 150. General HTTP requests (e.g., for processing or saving information) may be received by Dispatcher process 128 via HTTP connector communication thread 124 and forwarded to software work process 130. Requests for progress information may be received by dispatcher process 128 via HTTP connector communication thread 126 and forwarded to software work process 150. For example, requests for progress information may include requests for information on the progress of the processing of requests sent to software work process 130.

Software work process 130 includes a HTTP handler 132 for handling the HTTP communication for the user interface (UI). While, software work process 150 includes a HTTP handler 152 for handling or performing HTTP communications for requests for progress information. For example, HTTP handlers 132 and 152 may receive HTTP requests from client 120 and may send HTTP replies to client 120, for example. Software work process 130 also includes a UI controller 134 for generating and sending a user interface (UI) that is received and displayed by client 120, for example.

Business process platform 127 may also include a service manager 136 for providing message services to client 120, which may include generating (or creating) and sending messages to client 120. For example, service manager 136 may include an error message handler 137 for generating (or creating) and sending an error message, such as an error message instance, to client 120 when an error occurs during processing of a request from client 120. Service manager 136 also includes a progress information handler 139 for generating (or creating) and storing progress information in a shared memory 147, such as a progress information message instance that provides progress information that describes the progress of processing a request from client 120.

Software work process 130 may include one or more business objects 140. Business object models may define structure and behavior of one or more corresponding data objects. For example, a model may define a specific structure (e.g., hierarchical nodes and associated fields or attributes) and behavior (e.g., one or more enabled services or actions performed) for a specific type of business object. Business objects are real world entities modeled as objects in an information system. Business objects encapsulate both data structures and the functions, actions or services applied to the data, while hiding their full complexity from other objects. For example, different types of business objects may be stored or provided by software work process 130, such as an invoice business object (e.g., defining structure and behavior/functions for invoice instances), a customer business object (defining structure and behavior/functions for customer instances), and a shopping cart business object (defining structure and behavior/functions for shopping cart instances). For business objects, each instance of a business object follows the structure and behavior (e.g., services, functions or actions) defined by the corresponding business object.

Software work process 130 also includes messages (or message definitions) 142 which may include error message definitions 143 and progress information message definitions 145. In an example implementation, error message definitions 143 may define one or more error message types, such as a message type, text for the message, and one or more parameters or variables for each error message type. Similarly, progress information message definitions 145 may define one or more progress information message types including a message type, text for the message, and one or more parameters or variables for the progress information message. The message definitions stored in messages 142 may include other or additional information.

A client instruction (or client request) may be received by dispatcher process 128 from client 120, e.g., to process or save information. Dispatcher process 128 forwards the client instruction to process or save information to software work process 130, and a session ID (session identifier) is assigned by business process platform 127 or dispatcher process 128 to this communication session with client 120. One or more business objects (BOs) 140 of software work process 130 may process the client instruction by performing one or more actions in response to the client instruction. As actions are performed by BOs 140, progress information handler 139 of service manager 136 may store progress information in shared memory 147.

Software work process 150 includes a progress information service 154 for providing progress information to client 120. A request for progress information may be received by dispatcher process 128 from client 120, where the request for progress may include the session ID of the client session for which progress information is being requested. Dispatcher process 128 forwards the request for progress information to software work process 150, e.g., since in this example, software work process 150 is assigned to handle requests for progress information as to the progress in processing or handling client instructions received via software work process 130. In one example implementation, progress information service 154 may perform a lookup in shared memory 147 based on the session ID to retrieve progress information associated with the session ID from shared memory 147. Progress information service 154 may then provide the requested progress information to client 120, e.g., as a reply to the request for progress information. In an example implementation, the progress information stored in shared memory 147 and provided to client 120 may include a progress information message instance.

FIG. 2 is a diagram illustrating a message definition editor according to an example implementation. According to an example implementation, a user may use message definition editor 210 during design time to define both error messages and progress information messages, and to assign each message definition to a business object, a node of a business object, and/or an action performed by a business object. Thereafter, during runtime, one or more instances of an error message may be generated (or created) based on an error message definition and then sent to client 120 if an error occurs during the processing of a client instruction (or performing one or more actions) by a BO. Similarly, during runtime, one or more instances of a progress information message may be generated or created by a BO 140 performs one or more actions. The progress information message instance, which indicates processing progress for the processing of the client instruction or client request, may then be stored in shared memory 147 with a session ID by service manager 136 and/or progress information handler 139. As new actions are performed by BOs 140, a new or updated progress information message instance may be generated and stored in shared memory 147, e.g., replacing or overwriting any previous progress information message instances stored in memory 147 for the session ID.

Progress information service 154 may then receive a request, including a session ID, for progress information from client 120. Progress information service 154 may perform a lookup in shared memory 147 based on the session ID for the progress information request to obtain the progress information message instance from the shared memory 147 for the identified session ID. The session ID may identify the communication session between the client 120 and the business process platform 127, and may identify or be associated with all (or one or more) communications between client 120 and business process platform 127, including communications handled by both (or multiple) software work processes 130 and 150, for example.

As shown in FIG. 2, at block 212, a user may define a message by specifying a system message group for the message (or message definition). The system message group may be identified, for example, as either an error message or a progress information message. Next, at block 214, a user may specify a message type, e.g., a different message type for each different type of message. In this example, the message type may be specified as finalize-sales-order-msg. At block 216, the actual message text for this message or message definition is specified by the user. In this example, the message text may be "Finalizing Sales Order—X % complete", where X is a parameter or variable that may be specified by the BO or other entity. This is merely an example of message text that may be used for a message definition.

At box 218 one or more parameters may be specified. In this example, the parameter X is identified in box 218 and matches the parameter X within the message text box 216. At block 220, a user may assign this message or message definition to a business object, a node or field within a business object, or an action, service or function performed by a business object. In this example, as shown in FIG. 2, several business objects are shown in FIG. 2, such as a sales order BO and a customer BO. The sales order business object includes (and may perform) several actions such as: confirm items in stock; calculate taxes and apply discounts; and, calculate sales order total. For example, this message definition may be assigned to the action "confirm items in stock," or other action that may be performed by the sales order BO.

Therefore, according to an example implementation, the message definition editor 210 may allow a user to assign a system message group, a message type, message text, and zero or more parameters for each message or message definition, and then assign the message to a business object, node or action performed by a business object. The message definition editor 210 may advantageously be used to define both error messages and progress information messages and assign them to a business object, node and or action. Therefore, this use of a single (or common) message definition editor (for example, 210) may provide an efficient approach to allow for the definition and assignment of both error messages and progress information messages at design time.

The messages or message definitions, and their assignments to BOs, nodes or actions, may be stored in a metadata repository at design time. The message definitions and assignments of messages to one or more BOs, nodes (fields) or actions, for both error messages and progress information messages, may be stored in message definitions 142 (FIG. 1) for use during runtime.

The Progress information message illustrated in FIG. 2 is provided merely as an example, and other progress information messages may be used. Some other examples will be briefly described. For example, when a user selects "submit" when filling out a sales order, this client request (or client instruction) may be forwarded to one or more BOs 140, e.g., to a sales order BO, via a first software work process 130.

According to an example implementation, the sales order BO 140 of the first software work process 130 may then process the client instruction ("submit"), which may include, for example, performing several subprocesses. Each subprocess may include one or more actions performed by the BO 140. Example subprocesses performed by the sales order BO to process this client instruction may include, for example: 1) finalizing the sales order, 2) checking the sales order, 3) saving the sales order, and 4) sending a reply to the client. Finalizing the sales order may include actions such as, confirming items in stock, calculating taxes and applying discounts, and, calculating sales order total. Checking the sales order may include, for example, performing the actions of checking the consistency of fields within the sales order (such as determining if zip code and city match), and determining if fields are consistent and provided in the correct format. Saving the sales order may include saving the sales order to memory or to a database (not shown) within business process platform 127. As a fourth subprocess, a reply may then be sent from software work process 130 to client 120 to provide a total amount for the sales order and a confirmation or receipt, for example, or to request payment information, if necessary. These are merely some example actions, and others may be used.

In some cases, a progress information message (or multiple progress information messages) may be assigned to the sales order BO, or assigned to one or more actions performed by the BO. For example, a message type "finalize-sales-order-msg" 214 shown in FIG. 2 may be assigned to each of the three actions of the finalizing the sales order subprocess, with the BO specifying a different value of the parameter X used for each action. For example, sales order BO 140 may use or specify the values of X as X=20, X=50, and X=80 for the three actions of the finalizing sales order subprocess.

For example, sales order BO may generate or create (and store in shared memory 147 along with the session ID) a first instance of the progress information message of type finalize-sales-order-msg (FIG. 2) where X=20 when the sales order BO is performing or has completed the first action of confirming items in stock. This first message instance would appear to the client 120 as, for example: "Finalizing Sales Order—20% complete." This first progress information message instance may be retrieved from shared memory 147 by second software work progress 150 and provided to client 120 upon request from client 120.

Similarly, sales order BO 140 may create or generate a second instance of the progress information message of type finalize-sales-order-msg where X=50 when the sales order BO has initiated, is performing or has completed the second action of calculating taxes and applying discounts. This second progress information message instance is then stored in shared memory 147 by service manager 136 and/or progress information handler 139, thereby overwriting the earlier or first instance of a progress information message for this session ID. This second progress information message instance may be retrieved from shared memory 147 by second software work progress 150 and provided to client 120 upon request from client 120. This second progress information message instance may appear to the client 120 as: "Finalizing Sales Order—50% complete," where the sales order 140 assigns a value of 50 to the parameter X. An assigned progress information message may be generated (created) and stored in memory 147 when the BO completes an action, or during performance of the action, or when performance of the action is started or initiated, depending on how it is implemented. This progress information message instance is then sent to the client 120 via a second software work process 150 in response to a request for progress information.

Sales order BO may create or generate a third instance of the progress information message of type finalize-sales-order-msg where X=80 when the sales order BO has performed (or initiated) the third action of calculating sales order total. This third progress information message instance is then stored in shared memory 147 by service manager 136 and/or progress information handler 139, along with the session ID for the client/server session, and would overwrite any previously stored progress information messages stored in memory 147 for the same session ID. This third progress information message instance may be retrieved from shared memory 147 by second software work progress 150 and provided to client 120 upon request from client 120. This third progress information message instance may appear to the client 120 as: "Finalizing Sales Order—80% complete," where the sales order BO assigns a value of 80 to the parameter X. These are merely example messages and other messages may be used, either with or without the use of variables or parameters.

Other progress information message instances may be similarly generated or created, and stored in shared memory 147. Each of these progress information message instances may be retrieved from shared memory 147 by second software work process 150 and provided to client 120 upon request. For example, a progress information message of type check-sales-order-msg may be assigned to one or more actions of the check sales order subprocess, such as being assigned to the action of checking the consistency of fields of the sales order. When the sales order BO performs the action of checking the consistency of fields of the sales order, the BO may create an instance of the progress information message type check-sales-order-msg. This message instance may be stored in the shared memory 147, and then retrieved and provided to client 120 by second software work process 150 upon request. This message instance may be provided or presented to client 120 as: "Checking Sales Order", for example. These are merely examples, and other BOs, actions, message types and messages may be used.

During the processing of the client instruction, the BO may detect one or more errors or error conditions. For example, while performing the action of checking consistency of fields of the sales order, the sales order BO may determine that the state and zip code fields are inconsistent or do not match (e.g., zip code is for a different state). During design time, a user may have assigned a message of type check-sales-order-error-msg to the action of checking consistency of fields, wherein the message text of "Fields in sales order are inconsistent" will be displayed to client 120 if an error is detected while performing this action. This error message definition and assignment may be stored in progress information message definitions 145. In such case, in response to detecting the inconsistency between the state field and a zip code field of the sales order, the sales order BO may retrieve the message definition for message type check-sales-order-error-msg from progress information message definitions 145, and may then create or generate an instance of such error message, which may be sent to the client 120 via a reply or response via first software work process 130.

According to another example, an error message of type confirm-items-in-stock-error-msg may be assigned to the action of confirming items are in stock, or assigned to any errors detected while performing the action of confirming sales order items are in stock. The message text of "Item Y is not in stock" may be associated with this message type, for example, where the sales order BO may fill in or specify the specific item number that is not in stock, as the parameter Y. For example, a sales order BO may receive a sales order and may check that each listed item is in stock, e.g., by sending a query to and receiving a response from a database that maintains stock or inventory information (not shown) which may be part of business process platform 127 or other server. If an item on a sales order is not in stock in the requested quantity, then an error message instance of the type confirm-items-in-stock-error-msg is created and sent to the client 120 via a reply to the client instruction (or other response) via first software work process 130. These are merely two illustrative examples, and other BOs, errors, error message definitions, and error message instances may be used.

Therefore, according to an example implementation, error message instances may be generated by a BO 140 (or created/generated by infrastructure software 157 within business process platform 127 in response to a request or call by the BO) in response to detecting an error. Error message instances are sent via the first software work process 130, e.g., as a reply to the one or more client instructions or requests received from client 120. Thus, according to an example implementation, the same software work process (130) that receives the client instruction or client processing request may also return any error message instances to inform the client 120 of any errors that occurred during processing of the client instruction. On the other hand, progress information message instances may be generated or created by a BO (or created by infrastructure software 157 in response to a call or request by the BO), and then stored in a shared memory 147, e.g., with each error message instance being associated with a session ID for the client/server session. A newer or updated progress information message instance for a session ID may overwrite or replace an older progress information message instance in the shared memory 147 for the session ID. A second software work process 150, operating in parallel to the first software work process 130, may retrieve the progress information message instance from memory 147 and send the progress information message instance to client 120. The progress information message instance may provide client 120 with progress information that identifies the current state or progress of the processing of the client instruction received from client 120 via first software work process 130. Therefore, according to an example implementation, error message instances are sent by the first software work process 130 to client 120, and progress information message instances are sent by the second software work process 150 to client 120.

A common set of APIs (or API methods) may be used to create or generate both progress information message instances and error message instances. Other common APIs may be used to perform processing related to both progress information message instances and error message instances.

In an example implementation, the sales order BO may generate or create a progress information message instance by calling or raising a first method of an application programming interface (API) to infrastructure software 157. For example, the sales order BO may call a "Create" method of an API to infrastructure software 157 of business process platform 127, specifying the message type (e.g., finalize-sales-order-msg) and the value for the parameter X, in order to generate or create the message instance. The session ID may also be specified. This call of the create method of the API to the infrastructure software 157 may have a format, such as:

Create (finalize-sales-order-msg, X=30).

In response to a BO 140 calling or raising this create method API, the infrastructure software 157 of the business process platform (or ABAP backend server) 127 may generate the requested progress information message instance based on the associated message definition stored in progress information message definitions 145 for the specified message definition (finalize-sales-order-msg) and the value specified by BO 140 for the parameter X. In this example, therefore, the infrastructure software 157 may generate the progress information message instance that includes the text: "Finalizing Sales Order—30% complete", and return this message instance to the BO 140.

A second API method, such as a Send method may be called by sales order BO to service manager 136 to cause service manager 136 and/or progress information handler 139 to store the created message instance in the shared memory 147. This call of the Send method of the API from the BO to the service manager 136 may have a format, such as, for example:

Send (Finalizing Sales Order—30% complete, message ID1, session ID1, progress information message group), where message ID1 is a message ID that identifies or is associated with this message instance, and session ID 1 identifies this client/server session, and progress information message group identifies the message group for this message instance. Because this message instance is a member of the progress information message group, the service manager 136 forwards the received Send method to progress information handler 139. Progress information handler 139 then stores progress information for the progress information message instance in shared memory 147. In one example implementation, progress information handler 139 stores the message text (e.g., Finalizing Sales Order—30% complete) along with the session ID in the shared memory 147.

Therefore, in an example implementation, the sales order BO may generate or create an instance of a progress information message by calling or raising a first method (e.g., a Create method) of an application programming interface (API). For example, infrastructure software 157 may generate or create the progress information message instance in response to receiving the called or raised Create method from the BO. A second API method, such as a Send method may be called by the BO to cause service manager 136 and/or progress information handler 139 to store the created progress information message instance in the shared memory 147.

The same methods of the API (e.g., Create method and Send method) may also be used by the BOs to create or generate an error message and send the error message to the client 120, e.g., when an error is detected by the BO. In this manner, a common API may be used for creating and sending both progress information message instances and error message instances.

For example, while a sales order BO is performing the action of confirming sales order items are in stock, the BO may determine that one of the requested items listed on the sales order is not in stock in the requested quantity. In response to detecting this error condition, the sales order BO may raise or call the Create method of the API to the infrastructure software 157 to cause an error message instance to be created. For example, this call by the BO of the Create method of the API to the infrastructure software 157 may have a format, such as:

Create (confirm-items-in-stock-error-msg, Y=3314), where 3314 is the item number of the item that is not in stock. The session ID may also be specified in the call. In response to the call of this Create method, infrastructure software 157 then creates the requested error message instance based on the message type and the specified value for parameter Y in the Create method and the error message definition for this message type stored in error message definitions 143, and returns the error message instance to the sales order BO. For example, infrastructure software 157 may retrieve the text of the error message of message type confirm-items-in-stock-error-msg from error message definitions 143, and then may substitute the specified value (e.g., 3314) for variable or parameter Y into the message text. This error message instance is then returned to the BO.

The BO may then raise or call the Send method of the API to cause the first software work process 130 to send the error message instance to the client 120. This call of the Send method of the API from the BO to the service manager 136 may have a format, such as, for example:

Send (Item 3314 is not in stock, message ID1, session ID1, error message group), where message ID1 is a message ID that identifies or is associated with this message instance, and session ID1 identifies this client/server session, and error message group identifies the system message group for this message instance. Because this message instance is a member of the error message group, the service manager 136 forwards the received Send method error message handler 137. Error message handler then sends the error message instance via software work process 130 to the client 120, e.g., via a reply to the client instruction received from client 120.

As noted above, service manager 136 of the first software work process may store progress information in shared memory 147. This progress information may be retrieved by the second software work process 150 and provided to the client 120 upon request for progress information. In one example implementation, the progress information stored in shared memory may include the progress information message instance, which may be stored in shared memory 147 along with a session ID.

However, it is not necessary to store the message text for a progress information message instance within shared memory 147. Rather, according to another example implementation, in response to the Send method from BO 140, progress information may be stored by service manager 136 in shared memory 147 that includes, e.g., (message type, any parameter value(s), and session ID). In this example, message definitions 142 (including definitions 143 and 145) may be provided as (or within) message definitions 159 that may be accessible by both software work processes 130 and 150. In response to a request for progress information received by software work process 150 from client 120, the progress information service 154 may perform a lookup in shared memory 147 to retrieve the message type and parameter values (if any) in shared memory 147 for the session ID. Progress information service 154 may then generate the progress information message instance by retrieving the message definition (including the message text) from message definitions 159 for the specified message type, and fill in any values for parameters or variables.

In one example implementation, the progress information message instance (or text thereof) is language-dependent. For example, a user may be logged in (or may otherwise specify) via specific language, and the progress information message instance (or text thereof) may be converted to the specifically requested language of the user, e.g., by progress information service 154, or other block. Different language versions of the progress information message may be stored in shared memory 147, or in message definitions 142, or other location, and may be retrieved upon lookup in shared memory 147, based on a language request specified by the client or user, for example. Software work process 150 may then send this progress information message instance to client 120 in a reply to the request for progress information.

Figure 3:
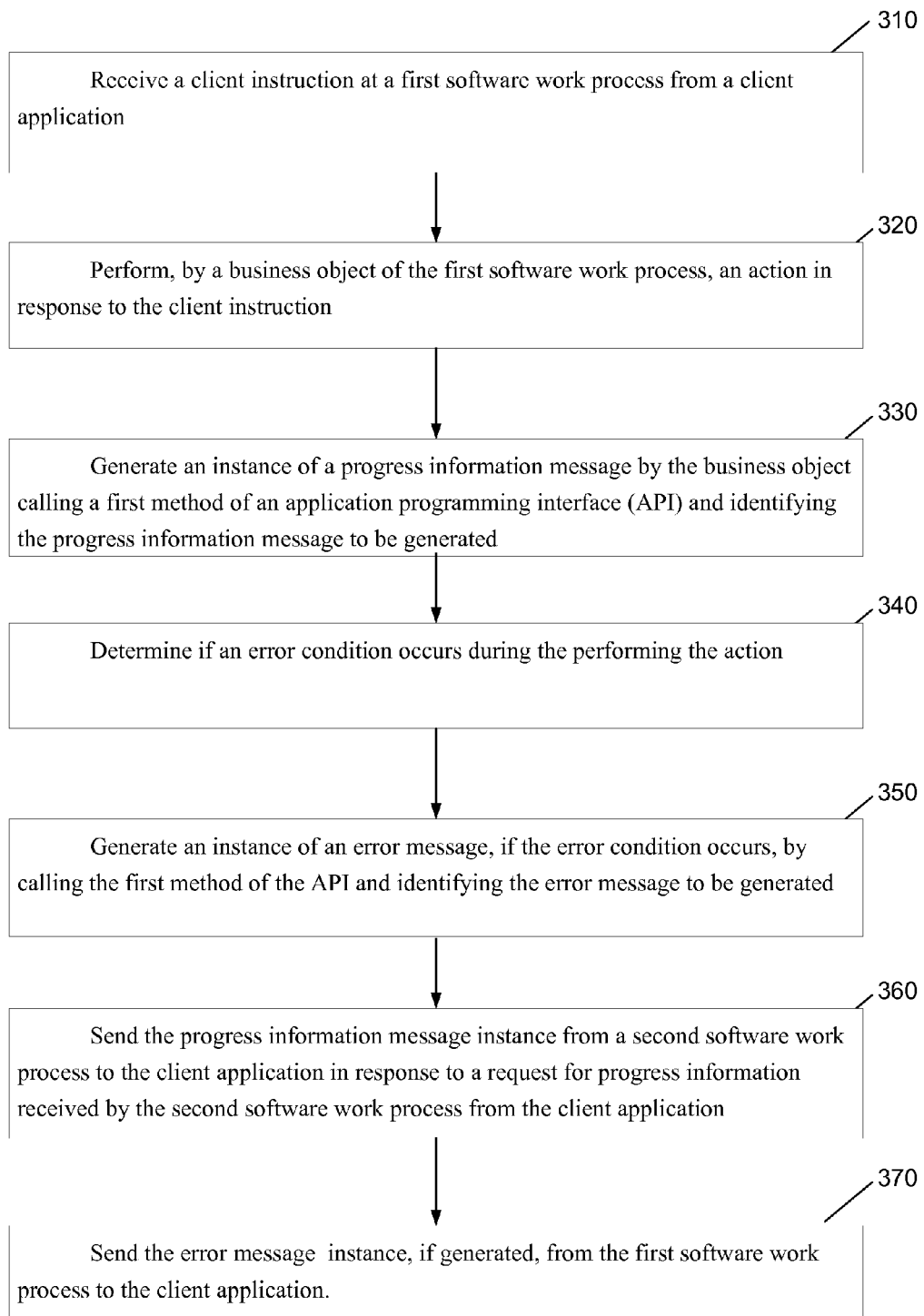
FIG. 3 is a flow chart illustrating operation of a business process platform according to an example implementation.

FIG. 3 is a flow chart illustrating operation of a business process platform according to an example implementation. At 310, a client instruction is received at a first software work process from a client application. At 320, a business object of the first software work process performs an action in response to the client instruction. At 330, an instance of a progress information message is generated by the business object calling a first method of an application programming interface (API) and identifying the progress information message to be generated. At 340, it is determined if an error condition occurs during the performing the action. At 350, an instance of an error message is generated, if the error condition occurs, by calling the first method of the API and identifying the error message to be generated. At 360, the progress information message instance is sent from a second software work process to the client application in response to a request for progress information received by the second software work process from the client application. At 370, the error message instance is sent, if generated, from the first software work process to the client application.

The flow chart of FIG. 3 may further include using a same message definition editor or user interface to: define the progress information message, assign the progress information message to the business object or to the action, define the error message, and assign the error message to the business object or to the action.

In an example implementation, the flow chart of FIG. 3 may further include using a same message definition editor or user interface to: define the progress information message, assign the progress information message to the first action, define the error message; and assign the error message to the second action.

The flow chart of FIG. 3 wherein operation 330 includes calling or raising, by the business object, the first method of the API, including identifying a message type that identifies a message definition and identifying one or more parameters, and generating or creating the instance of the progress information message, in response to the calling or raising the first method of the API, based on a progress information message definition associated with the identified message type and the one or more parameters.

In an example implementation, operation 350 may include calling or raising, by the business object, the first method of the API, including identifying a message type that identifies a message definition and identifying one or more parameters, and generating or creating the instance of error message, in response to the calling or raising the first method of the API, based on an error message definition associated with the identified message type and one or more parameters.

In an example implementation, operation 370 may include sending the error message instance, if generated, from the first software work process to the client application as a reply to the request from the client application.

In an example implementation, operation 360 may include storing a message type identifying the progress information message type in a shared memory along with a session ID, receiving, by the second software work process from the client application, a request for progress information including the session ID, performing a lookup in the shared memory based on the received session ID to identify the message type for the progress information message, obtaining text of the progress information message based on a stored message definition, creating or generating the progress information message instance based on the message text, and sending the progress information message instance from the second software work process to the client application in response to the request for progress information.

In an example implementation, operation 350 may include generating an instance of an error message, if the error condition occurs, by calling the first method of the API and including identifying a message type that identifies a message definition.

In an example implementation with respect to FIG. 3, the first method of the API may include a create method that causes an instance of either an error message or an instance of a progress information message to be generated or created based on a message type that is provided that identifies a message definition.

In an example implementation, operation 330 may include generating an instance of a progress information message by calling a create method of the API and including identifying a message type that identifies a message definition of the progress information message to be created.

Figure 4:
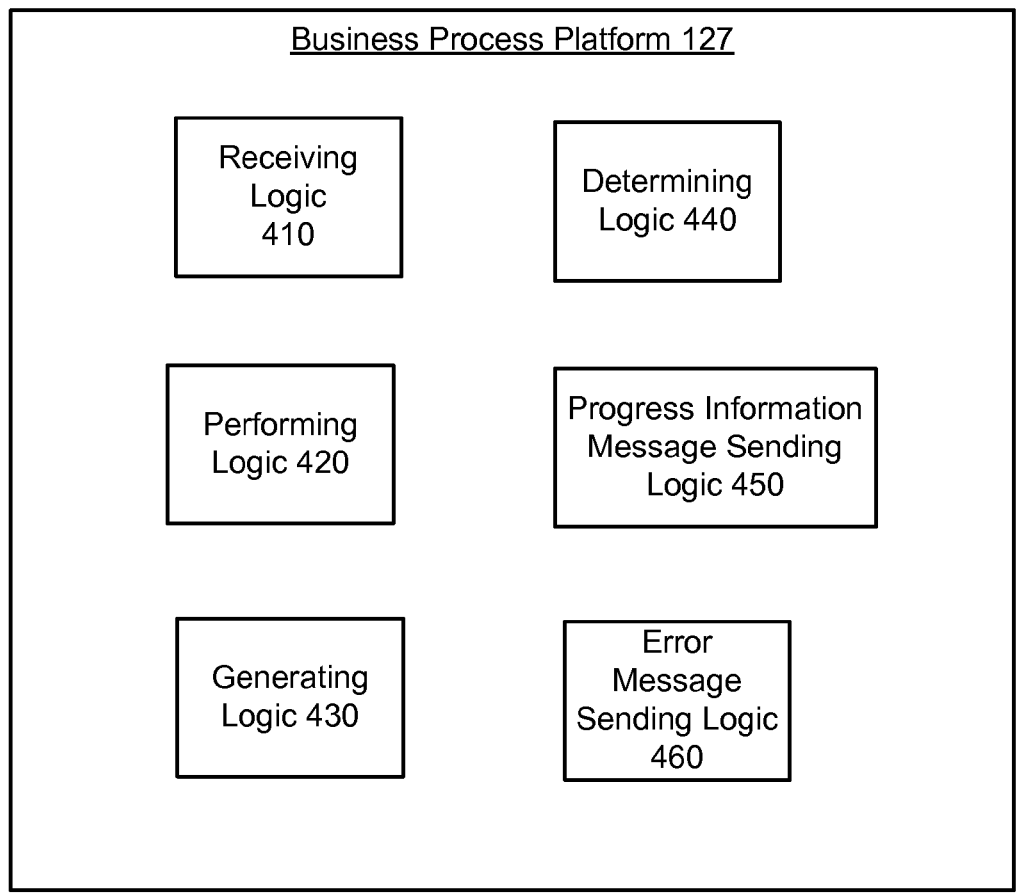
FIG. 4 is a block diagram illustrating a business process platform according to an example implementation.

FIG. 4 is a block diagram illustrating a business process platform according to an example implementation. Business process platform 127 includes receiving logic 410 configured to receive a client instruction at a first software work process from a client application, performing logic 420 configured to perform an action in response to the client instruction, generating logic 430 configured to generate an instance of a progress information message by calling a first method of an application programming interface (API) and identifying the progress information message to be generated, determining logic 440 configure to determine if an error condition occurs during the performing the action. The generating logic 430 is also configured to generate an instance of an error message if the error condition occurs by calling the first method of the API and identifying the error message to be generated. The business process platform 127 also includes progress information message sending logic 450 configured to send the progress information message instance from a second software work process to the client application in response to a request for progress information received by the second software work process from the client application, and error message sending logic 460 configured to send the error message instance, if generated, from the first software work process to the client application.

Figure 5:
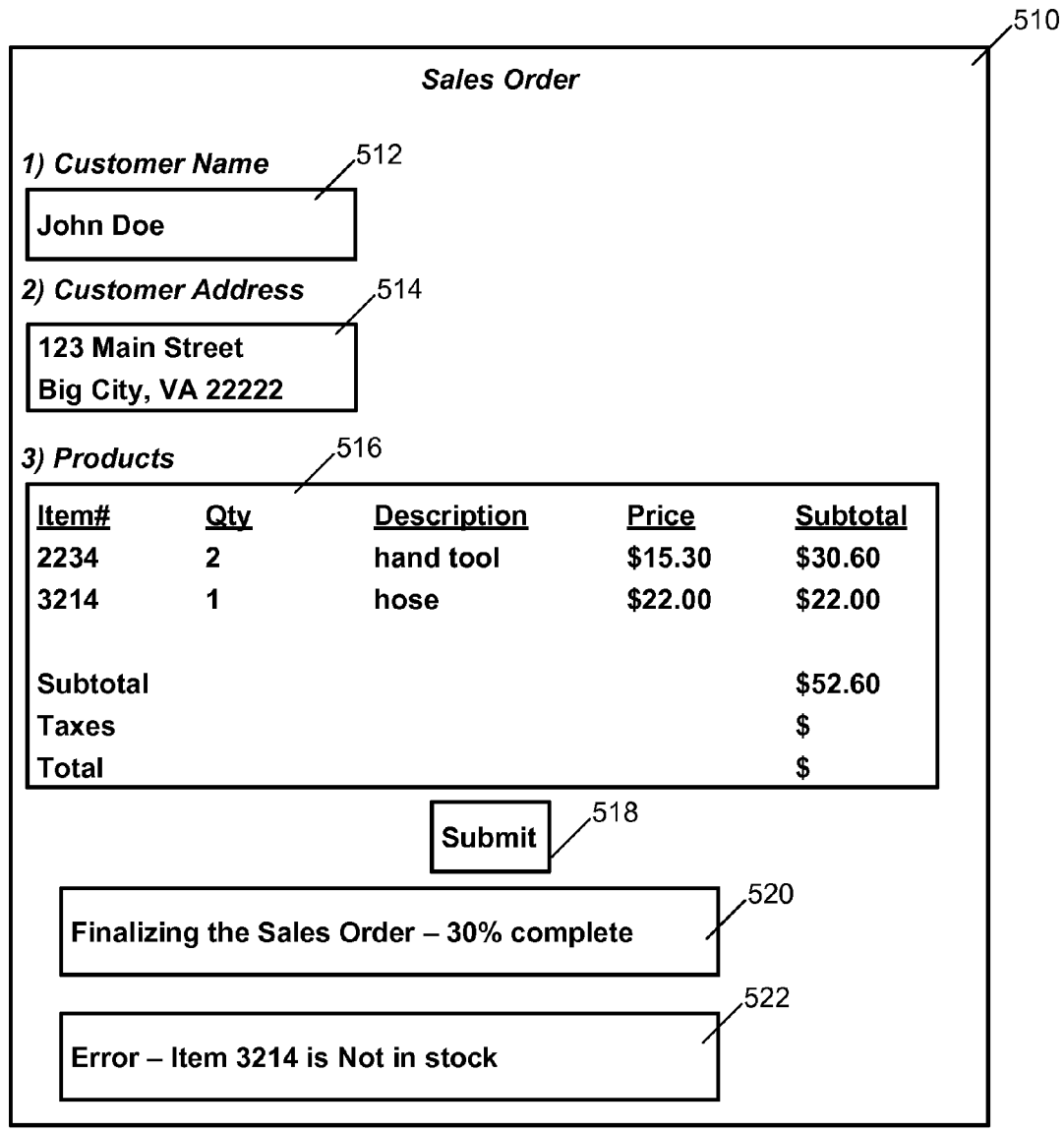
FIG. 5 is a diagram illustrating an example sales order.

FIG. 5 is a diagram illustrating an example sales order. Sales order 510 may include a number of fields that a user may input information including customer name 512, customer address 514, a products field 516, and a submit button 518. A user or customer may input information for his customer name, in field 512, his address in field 514, and may input information for one or more items or products to be purchased or ordered within field 516. When the sales order has been filled out, the user may select or press the submit button 518, which causes the sales order 510, along with a client instruction to process the sales order 510, to be sent from client 120 to dispatcher process 128 (FIG. 1). The sales order 510 and client instruction are forwarded to a software work process 130, and then to a sales order business object (BO) 140, which may be associated with the sales order 510. In order to process the received sales order 510, sales order BO 140 may perform several subprocesses, as noted above, such as finalizing the sales order, checking the sales order, saving the sales order, and sending a reply to the client 120.

Finalizing the sales order may include several actions, such as confirming items in stock, and other actions. During, or after, the sales order BO 140 performs the action of confirming whether the requested items/products are in stock, the sales order BO 140 may create a progress information message instance, or progress information, and service manager 136 stores this progress information in shared memory 147, according to one example implementation. The entire progress information message instance may be stored in shared memory 147 along with a session ID, or simply a message type and session ID for the created message may be stored in shared memory 147.

For example, the sales order BO 140 may raise or call a Create method of an API to cause an infrastructure software 157 to create or generate progress information, such as either: 1) a progress information message instance that includes message text, parameter values (if any) and a session ID, or 2) a message type, parameter values (if any) and a session ID. Sales order BO 140 may receive the progress information from the infrastructure software 157, and may call or raise a Send method to service manager 136, and provide the progress information to service manager 136. In response, the service manager may store the progress information in shared memory 147.

The first alternative format of stored progress information that includes the text of the message instance may allow progress information service 154 to retrieve the message instance directly from the shared memory 147. Whereas, the second alternative format of progress information (including message type, parameter values and session ID) may allow progress information service 154 to regenerate such message instance based on the stored progress information and the message definition for the identified message type stored in message definitions 159, for example.

In response to a request for progress information received by software work process 150, the progress information service 154 retrieves the progress information from shared memory and provides the progress information message instance to client 120, in order to provide client 120 with information describing the progress of business process platform 127 in processing the sales order 510, for example.

In response to a request for progress information, progress information service 154 may perform a lookup into shared memory 147 based on a session ID for the client/server session ID to retrieve a progress information message instance from shared memory 147. Or, alternatively, progress information service 154 may perform a lookup into shared memory 147 based on the session ID to obtain the message type and any values for parameters or variables, and then generate, or regenerate the progress information message instance based on the text for the message type stored in the message definitions 159. Software work process 150 may then send the progress information message instance to the client 120 to fulfill the request for progress information. The progress information message instance may be received by client 120 and displayed to a user via box 520.

During the sales order BO 140 performing the action of confirming whether the requested items/products are in stock, the sales order BO may determine that one of the items (e.g., item 3214) is not in stock. Therefore, sales order BO 140 may generate and send an error message instance via software work process 130 to client 120, which is then displayed in box 522.

A same set of APIs (e.g., Create, Send, and/or other methods) may be used to create and save or send both progress information message instances and error message instances. For example, in response to detecting the error, sales order BO may use the Create method to cause infrastructure software 157 to generate or create an error message instance. Sales order BO 140 may then use the Send method to cause service manager 136 to send the error message instance to the client 120 via software work process 130.

Implementations of the various techniques described herein may be implemented in digital electronic circuitry, or in computer hardware, firmware, software, or in combinations of them. Implementations may implemented as a computer program product, i.e., a computer program tangibly embodied in a non-transitory machine-readable storage device (e.g., a semiconductor or magnetic material-based storage device), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and including executable code that, when executed, is configured to cause at least one data processing apparatus to:
   receive a client instruction at a first software work process from a client application;
   perform, by a business object of the first software work process, an action in response to the client instruction;
   generate an instance of a progress information message by the business object calling a first method of an application programming interface (API) and identifying the progress information message to be generated;
   determine if an error condition occurs during the performing the action;
   generate an instance of an error message, if the error condition occurs, by calling the first method of the API and identifying the error message to be generated;
   send the progress information message instance from a second software work process to the client application in response to a request for progress information received by the second software work process from the client application;
   send the error message instance, if generated, from the first software work process to the client application; and
   use a same message definition editor or user interface to:
      define the progress information message;
      assign the progress information message to the business object or to the action;
      define the error message; and
      assign the error message to the business object or to the action.

2. The computer program product of claim 1, wherein the action comprises a first action and a second action, wherein the executable code is further configured to cause at least one data processing apparatus to:
   use the same message definition editor or user interface to:
      define the progress information message;
      assign the progress information message to the first action;
      define the error message; and
      assign the error message to the second action.

3. The computer program product of claim 1, wherein the executable code being configured to cause at least one data processing apparatus to generate an instance of a progress information message comprises the executable code being configured to cause at least one data processing apparatus to:
   call or raise, by the business object, the first method of the API, including identifying a message type that identifies a message definition and identifying one or more parameters;
   generate or create the instance of the progress information message, in response to the calling or raising the first method of the API, based on a progress information message definition associated with the identified message type and the one or more parameters.

4. The computer program product of claim 1, wherein the executable code being configured to cause at least one data processing apparatus to generate an instance of an error message comprises the executable code being configured to cause at least one data processing apparatus to:
   call or raise, by the business object, the first method of the API, including identifying a message type that identifies a message definition and identifying one or more parameters;
   generate or create the instance of error message, in response to the calling or raising the first method of the API, based on an error message definition associated with the identified message type and one or more parameters.

5. The computer program product of claim 1, wherein the executable code being configured to cause at least one data processing apparatus to send the error message, if generated, from the first software work process to the client application comprises the executable code being configured to cause at least one data processing apparatus to:
   send the error message instance, if generated, from the first software work process to the client application as a reply to the request from the client application.

6. The computer program product of claim 1, wherein the executable code being configured to cause at least one data processing apparatus to send the progress information message from the second software work process to the client application comprises the executable code being configured to cause at least one data processing apparatus to:
   store a message type identifying the progress information message type in a shared memory along with a session ID;
   receive, by the second software work process from the client application, a request for progress information including the session ID;
   perform a lookup in the shared memory based on the received session ID to identify the message type for the progress information message;

obtain text of the progress information message based on a stored message definition;

create or generate the progress information message instance based on the message text; and send the progress information message instance from the second software work process to the client application in response to the request for progress information.

7. The computer program product of claim 1, wherein the executable code being configured to cause at least one data processing apparatus to generate an instance of an error message comprises the executable code being configured to cause at least one data processing apparatus to:

generate an instance of an error message, if the error condition occurs, by calling the first method of the API and including identifying a message type that identifies a message definition.

8. The computer program product of claim 1, wherein the first method of the API comprises a create method that causes an instance of either an error message or an instance of a progress information message to be generated or created based on a message type that is provided that identifies a message definition.

9. The computer program product of claim 1, wherein the executable code being configured to cause at least one data processing apparatus to generate an instance of a progress information message comprises the executable code being configured to cause at least one data processing apparatus to generate an instance of a progress information message by calling a create method of the API and including identifying a message type that identifies a message definition of the progress information message to be created.

10. A computer-implemented method comprising:

receiving a client instruction at a first software work process from a client application;

forwarding the client instruction to a business object associated with the first software work process;

performing, by the business object, an action in response to the client instruction;

generating an instance of a progress information message by the business object calling a first method of an application programming interface (API) and identifying the progress information message to be generated;

determining if an error condition occurs during the performing the action;

generating an instance of an error message, if the error condition occurs, by calling the first method of the API and identifying the error message to be generated;

sending the progress information message instance from a second software work process to the client application in response to a request for progress information received by the second software work process from the client application; and sending the error message instance, if generated, from the first software work process to the client application, wherein the sending the progress information message from the second software work process to the client application includes:

storing, by the first software work process, a message type identifying the progress information message type in a shared memory along with a session ID;

receiving, by the second software work process from the client application, a request for progress information including the session ID;

performing a lookup in the shared memory based on the received session ID to identify the message type for the progress information message;

obtaining text of the progress information message based on a stored message definition; and creating or generating the progress information message instance based on the message text.

11. The computer-implemented method of claim 10 and further comprising using a same message definition editor or user interface to:

define the progress information message;

assign the progress information message to the business object or to the action;

define the error message; and assign the error message to the business object or to the action.

12. The computer-implemented method of claim 10 wherein the generating an instance of a progress information message comprises:

calling, by the business object, the first method of the API, including identifying a message type that identifies a message definition and identifying one or more parameters;

generating the instance of the progress information message, in response to the calling the first method of the API, based on a progress information message definition associated with the identified message type and the one or more parameters.

13. The computer-implemented method of claim 10 wherein the generating an instance of an error message comprises:

calling, by the business object, the first method of the API, including identifying a message type that identifies a message definition and identifying one or more parameters;

generating the instance of error message, in response to the calling or raising the first method of the API, based on an error message definition associated with the identified message type and one or more parameters.

14. The computer-implemented method of claim 10 wherein the sending the progress information message from the second software work process to the client application comprises:

storing, by the first software work process, the progress information message in a memory; and retrieving, by the second software work process, the progress information message instance from the memory;

sending the retrieved progress information message instance from the second software work process to the client application in response to the request for progress information.

15. An apparatus comprising:

receiving logic configured to receive a client instruction at a first software work process from a client application;

performing logic configured to perform an action in response to the client instruction;

generating logic configured to generate an instance of a progress information message by calling a first method of an application programming interface (API) and identifying the progress information message to be generated;

determining logic configure to determine if an error condition occurs during the performing the action;

the generating logic configured to generate an instance of an error message if the error condition occurs by calling the first method of the API and identifying the error message to be generated;

progress information message sending logic configured to send the progress information message instance from a second software work process to the client application in response to a request for progress information received by the second software work process from the client application;

error message sending logic configured to send the error message instance, if generated, from the first software work process to the client application; and a message definition editor or user interface configured to:
define the progress information message;
assign the progress information message to the business object or to the action;
define the error message; and
assign the error message to the business object or to the action.

16. The apparatus of claim 15 wherein the performing logic, the generating logic and the determining logic comprise a business object.

17. The apparatus of claim 15 wherein the progress information message sending logic comprises:
a progress information service of the second software work process configured to perform the following in response to receiving a request for progress information for the processing of the request received by the first software work process:
performing a lookup into a memory based on a session ID;
obtain the progress information message instance based on the lookup; and
send the progress information message instance to the client.

18. The apparatus of claim 15 wherein the error message sending logic comprises:
the business object configured to call a create method of the API, including identifying a message type that identifies the error message to be created or generated;
the business object configured to call a send method of the API to an error message handler; and
the error message handler configured to send the error message instance to the client.

19. The apparatus of claim 15 wherein the error message sending logic includes logic configured to send the error message instance, if generated, from the first software work process to the client application as a reply to the request from the client application.

20. The apparatus of claim 15 wherein the progress information message sending logic include logic configured to:
store a message type identifying the progress information message type in a shared memory along with a session ID;
receive, by the second software work process from the client application, a request for progress information including the session ID;
perform a lookup in the shared memory based on the received session ID to identify the message type for the progress information message;
obtain text of the progress information message based on a stored message definition;
create or generate the progress information message instance based on the message text; and
send the progress information message instance from the second software work process to the client application in response to the request for progress information.

* * * * *